United States Patent
Kaufmann et al.

(10) Patent No.: US 11,091,148 B2
(45) Date of Patent: *Aug. 17, 2021

(54) HANDS ON STEERING WHEEL DETECT

(71) Applicant: Steering Solutions IP Holding Corporation, Saginaw, MI (US)

(72) Inventors: Timothy W. Kaufmann, Frankenmuth, MI (US); Daniel W. Fuesz, Novi, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 441 days.

This patent is subject to a terminal disclaimer.

(21) Appl. No.: 16/039,788

(22) Filed: Jul. 19, 2018

(65) Prior Publication Data

US 2018/0354501 A1 Dec. 13, 2018

Related U.S. Application Data

(63) Continuation of application No. 14/608,375, filed on Jan. 29, 2015, now Pat. No. 10,029,676.

(Continued)

(51) Int. Cl.
*B60W 30/00* (2006.01)
*B60W 30/02* (2012.01)
(Continued)

(52) U.S. Cl.
CPC ............ *B60W 30/00* (2013.01); *B60W 30/02* (2013.01); *B60W 40/08* (2013.01); *B62D 1/286* (2013.01);
(Continued)

(58) Field of Classification Search
CPC ...... B60W 30/00; B60W 30/02; B60W 40/08; B62D 1/286; B62D 5/0463; B62D 5/0466;
(Continued)

(56) References Cited

U.S. PATENT DOCUMENTS 4,337,967 A   7/1982   Yoshida et al.
4,691,587 A   9/1987   Farrand et al.
(Continued)

FOREIGN PATENT DOCUMENTS

CN   101037117 A   9/2007
CN   103419840 A   12/2013
(Continued)

OTHER PUBLICATIONS

China Patent Application No. 201510204221.5 Second Office Action dated Mar. 10, 2017, 8 pages.
(Continued)

*Primary Examiner* — Jeff A Burke
*Assistant Examiner* — Jamal A Shah
(74) *Attorney, Agent, or Firm* — Dickinson Wright PLLC

(57) ABSTRACT

A method for determining whether hands of an operator of a vehicle are positioned on a hand wheel of the vehicle is provided. The method generates a first frequency content below a first frequency from a hand wheel torque signal. The method generates a second frequency content above a second frequency from the first frequency content of the hand wheel torque signal. The method generates a hands on wheel (HOW) estimate signal based on the first frequency content and the second frequency content by determining a first contribution of the first frequency content to the HOW estimate signal, determining a second contribution of the second frequency content to the HOW estimate signal, and combining the first contribution and the second contribution (Continued)

to generate the HOW estimate signal. The method causes a system in a vehicle to operate based on the HOW estimate signal.

18 Claims, 9 Drawing Sheets

Related U.S. Application Data

(60) Provisional application No. 61/932,953, filed on Jan. 29, 2014.

(51) Int. Cl.
  *B62D 1/28* (2006.01)
  *B62D 5/04* (2006.01)
  *B62D 6/00* (2006.01)
  *B62D 6/04* (2006.01)
  *B62D 6/10* (2006.01)
  *B60W 40/08* (2012.01)

(52) U.S. Cl.
  CPC ......... *B62D 5/0463* (2013.01); *B62D 5/0466* (2013.01); *B62D 6/007* (2013.01); *B62D 6/008* (2013.01); *B62D 6/04* (2013.01); *B62D 6/10* (2013.01)

(58) Field of Classification Search
  CPC .......... B62D 6/007; B62D 6/008; B62D 6/04; B62D 6/10
  See application file for complete search history.

(56) References Cited

U.S. PATENT DOCUMENTS

| | | | |
|---|---|---|---|
| 4,962,570 A | 10/1990 | Hosaka et al. |
| 4,976,239 A | 12/1990 | Hosaka |
| 5,240,284 A | 8/1993 | Takada et al. |
| 5,319,803 A | 6/1994 | Allen |
| 5,618,058 A | 4/1997 | Byon |
| 5,668,721 A | 9/1997 | Chandy |
| 5,765,116 A | 6/1998 | Wilson-Jones et al. |
| 5,893,580 A | 4/1999 | Hoagland et al. |
| 6,354,622 B1 | 3/2002 | Ulbrich et al. |
| 6,373,472 B1 | 4/2002 | Palalau et al. |
| 6,381,526 B1 | 4/2002 | Higashi et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,055,409 B2 | 11/2011 | Tsuchiya |
| 8,069,745 B2 | 12/2011 | Strieter et al. |
| 8,079,312 B2 | 12/2011 | Long |
| 8,170,725 B2 | 5/2012 | Chin et al. |
| 8,260,482 B1 | 9/2012 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,670,891 B1 | 3/2014 | Szybalski et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,352,752 B2 | 5/2016 | Cullinane et al. |
| 9,360,865 B2 | 6/2016 | Yopp |
| 2003/0046012 A1 | 3/2003 | Yamaguchi |
| 2003/0094330 A1 | 5/2003 | Boloorchi et al. |
| 2003/0144801 A1* | 7/2003 | Braeuchle ............ B60Q 1/0076 702/56 |
| 2003/0227159 A1 | 12/2003 | Muller |
| 2004/0046346 A1 | 3/2004 | Eki et al. |
| 2004/0204808 A1 | 10/2004 | Satoh et al. |
| 2005/0081675 A1 | 4/2005 | Oshita et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0241548 A1 | 10/2007 | Fong |
| 2008/0009986 A1 | 1/2008 | Lu et al. |
| 2008/0238068 A1 | 10/2008 | Kumar et al. |
| 2009/0256342 A1 | 10/2009 | Cymbal et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0325202 A1 | 1/2013 | Howard et al. |
| 2013/0218396 A1 | 8/2013 | Moshchuk et al. |
| 2013/0233117 A1 | 9/2013 | Read et al. |
| 2014/0070933 A1 | 3/2014 | Gautama et al. |
| 2014/0111324 A1 | 4/2014 | Lisseman et al. |
| 2014/0257628 A1* | 9/2014 | Lee ..................... B62D 5/0481 701/34.4 |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0051780 A1 | 1/2015 | Hahne |

(56) References Cited

U.S. PATENT DOCUMENTS

| | | |
|---|---|---|
| 2015/0120142 A1 | 1/2015 | Park et al. |
| 2015/0210273 A1 | 2/2015 | Kaufmann et al. |
| 2015/0246673 A1 | 4/2015 | Tseng et al. |
| 2015/0251666 A1 | 7/2015 | Attard et al. |
| 2015/0324111 A1 | 9/2015 | Jubner et al. |
| 2015/0283998 A1 | 10/2015 | Lind et al. |
| 2016/0071418 A1 | 3/2016 | Oshida et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0362084 A1 | 12/2016 | Martin et al. |

FOREIGN PATENT DOCUMENTS

| | | |
|---|---|---|
| DE | 102005056438 A1 | 6/2007 |
| DE | 102010025197 A1 | 12/2011 |
| DE | 102011056042 A1 | 6/2013 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1932745 A2 | 6/2008 |
| EP | 2426030 A1 | 3/2012 |
| EP | 2604487 A1 | 6/2013 |
| JP | H05162652 A | 6/1993 |
| WO | 2006099483 A1 | 9/2006 |
| WO | 2010082394 A1 | 7/2010 |

OTHER PUBLICATIONS

Chinese Office Action & Search Report for Chinese Application No. 201510204221.5 dated Aug. 29, 2016, 5 pages, no English translation available.

EP Application No. 15152834.6 Extended European Search Report dated Oct. 8, 2015, 7 pages.

European Search Report for related European Application No. 15152834.6, dated: Oct. 8, 2015; 7 pages.

* cited by examiner

HANDS ON STEERING WHEEL DETECT

CROSS-REFERENCE TO RELATED APPLICATIONS

This application is a continuation of U.S. application Ser. No. 14/608,375 filed Jan. 29, 2015, which patent application claims priority to U.S. Provisional Patent Application Ser. No. 61/932,953, filed Jan. 29, 2014, which is incorporated herein by reference in its entirety.

BACKGROUND OF THE INVENTION

In order to detect whether the hands of a vehicle operator are positioned on a hand wheel of the vehicle, some conventional detection systems require one or more sensors placed on the hand wheel. The signals from the sensors are then routed to a controller and processed to make a final determination of whether the hands are on or off the hand wheel. Providing additional sensors to detect if the vehicle operator's hands are positioned on the hand wheel adds cost and complexity to a steering system.

SUMMARY OF THE INVENTION

In one embodiment of the invention, a method for determining whether hands of an operator of a vehicle are positioned on a hand wheel of the vehicle is provided. The method generates a first frequency content below a first frequency from a hand wheel torque signal. The method generates a second frequency content above a second frequency from the first frequency content of the hand wheel torque signal. The method generates a hands on wheel (HOW) estimate signal based on the first frequency content and the second frequency content by determining a first contribution of the first frequency content to the HOW estimate signal, determining a second contribution of the second frequency content to the HOW estimate signal, and combining the first contribution and the second contribution to generate the HOW estimate signal. The method causes a system in a vehicle to operate based on the HOW estimate signal.

In another embodiment of the invention, a control system of a vehicle is provided. The control system comprises a hand wheel torque sensor configured to generate a hand wheel torque signal based on a movement of a hand wheel of the vehicle and a control module for determining whether hands of an operator of the vehicle are positioned on a hand wheel of the vehicle. The control module is configured to generate a first frequency content below a first frequency from a hand wheel torque signal, generate a second frequency content above a second frequency from the first frequency content of the hand wheel torque signal, generate a hands on wheel (HOW) estimate signal based on the first frequency content and the second frequency content, and cause another system in a vehicle to operate based on the HOW estimate signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
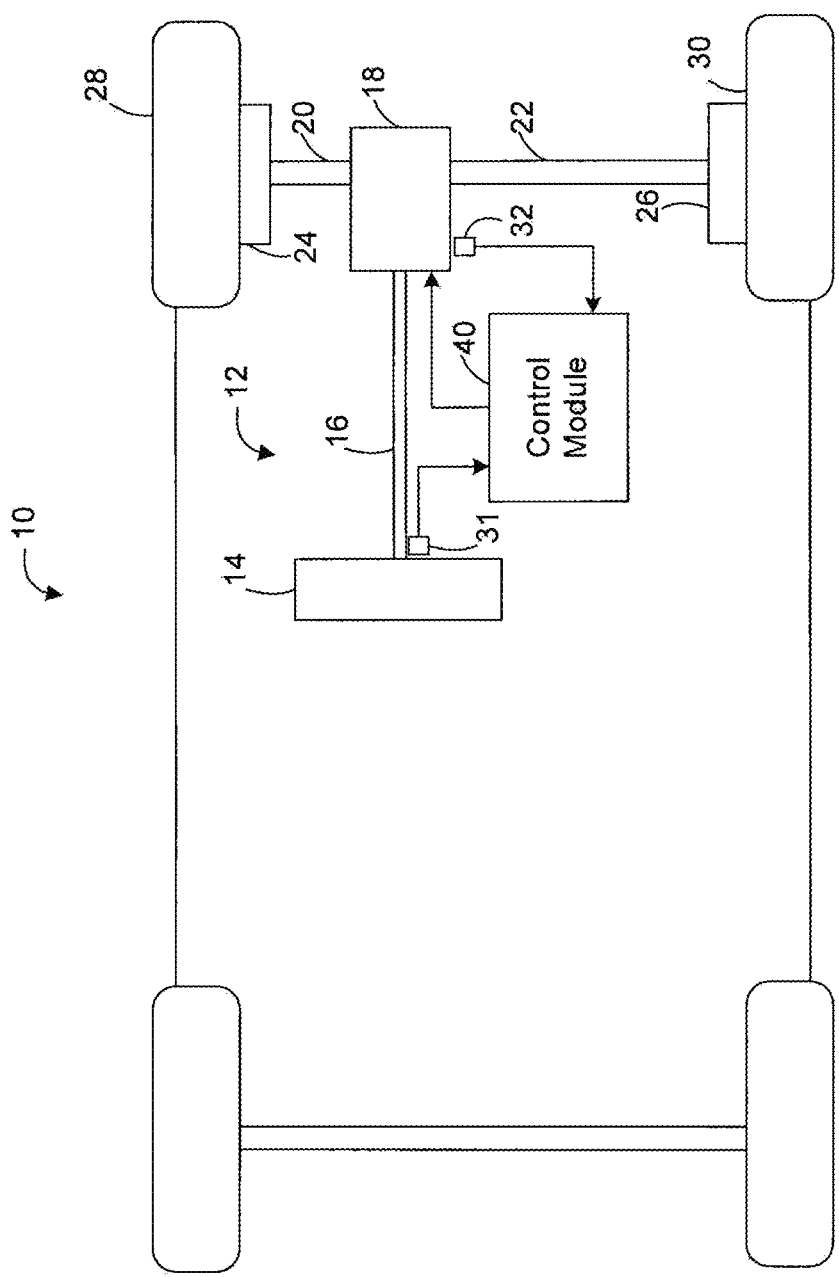
FIG. 1 illustrates a functional block diagram of a steering system in accordance with exemplary embodiments of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, where the invention will be described with reference to specific embodiments without limiting same, exemplary embodiments of a vehicle 10 including a steering system 12 are illustrated. In some embodiments, the steering system 12 includes a hand wheel 14 coupled to a steering shaft 16. In some embodiments, the steering system 12 is an electric power steering (EPS) system that further includes a steering control unit 18 that couples to the steering shaft 16 of the steering system 12 and to tie rods 20, 22 of the vehicle 10. The steering control unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering control unit 18 provides the force to move the tie rods 20, 22 which in turn move steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors (e.g., sensors 31 and 32) that detect and measure observable conditions of the steering system 12 and/or of the vehicle 10. The sensors generate sensor signals based on the observable conditions. In some embodiments, the sensors may include, for example, a hand wheel torque sensor, a vehicle speed sensor, and other sensors. The sensors send the signals to the control module 40. In some embodiments, the signals from sensors are time domain based signals each having a sequence of data points measured at successive time intervals. Only two sensors are depicted in FIG. 1 for simplicity of illustration but the vehicle 10 may have many more sensors.

A control module 40 controls the operation of the steering system 12 and/or the vehicle 10 based on one or more of the enabled sensor signals and further based on the hands on wheel (HOW) detection system and method of the present disclosure. In some embodiments, the control module generates HOW estimate signal and/or HOW state values based on a hand wheel torque signal from the hand wheel torque sensor. In some embodiments, the HOW estimate signal represents a value within a range (e.g., 0 to 1) that indicates the likelihood that the hands of an operator of the vehicle 10 are on (e.g., 1) or off (e.g., 0) the hand wheel 14. In some embodiments, the HOW state signal represents an enumerated discrete value that specifies the confidence level of the operator's hands on or off of the hand wheel 14.

In some embodiments, the control module 40 causes other system(s) (not shown) of the vehicle 10 to operate based on the HOW estimate signal and the HOW state signal by supplying the signals to the system(s). Such other systems may include advanced driver assistance systems (ADAS) and electronic stability control (ESC) systems. Some of the types of ADAS are adaptive cruise control systems, lane keeping assist systems and lane centering control steering systems. ESC systems, on the other hand, use computerized technologies that improve vehicle handling by detecting and preventing unstable conditions. In some cases, these other systems need to know whether the operator hands are on or off the hand wheel to provide respective features of the systems. In some embodiments, the HOW estimate signal and the HOW state signal may be used to alert the operator of vehicle 10 to take control of the hand wheel 14 by, for example, sending audio, visual, and/or haptic notifications to the operator.

Figure 2:
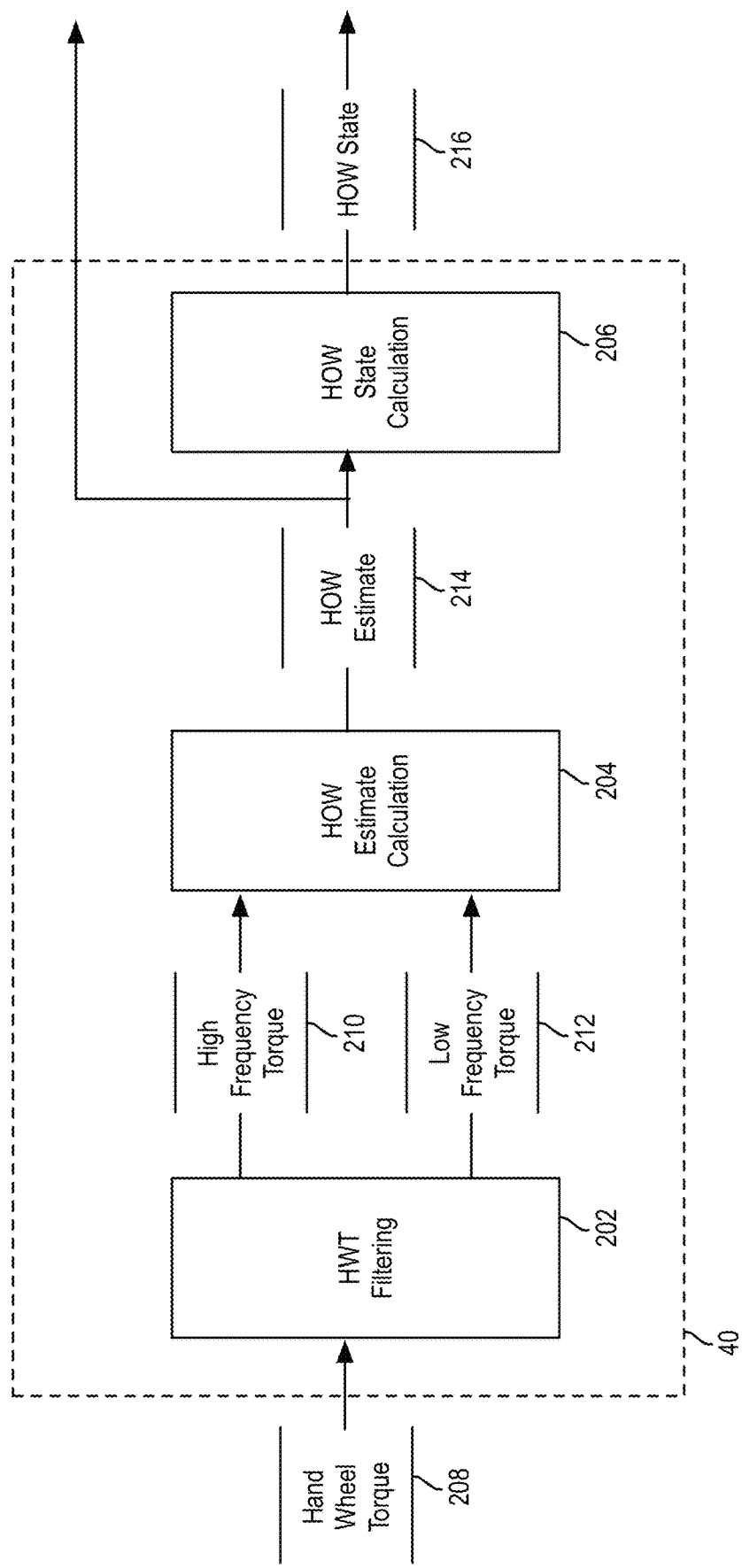
FIG. 2 illustrates a schematic diagram of a control module in accordance with exemplary embodiments of the invention.

FIG. 2 illustrates a schematic diagram of the control module 40 of FIG. 1 in accordance with exemplary embodiments of the invention. As shown, the control module 40 may include submodules, such as a hand wheel torque (HWT) filtering module 202, a HOW estimate calculation module 204, and a HOW state calculation module 206. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in the figures can be combined and/or further partitioned. As can be appreciated, the sub-modules shown in the figures can be implemented as a single control module 40 (as shown) or multiple control modules (not shown). Inputs to the control module 40 can be generated from the sensors of the vehicle 10, can be modeled within the control module 40 (e.g., by other sub-modules (not shown)), can be received from other control modules (not shown), and/or can be predefined.

The HWT filtering module 202 receives a HWT signal 208, which is generated and sent by the hand wheel torque sensor of FIG. 1. In some embodiments, the HWT signal is a digital signal. In some embodiments, the hand wheel torque signal is an analog signal, which may be digitally sampled by another module (not shown) before being received by the HWT filtering module 202. The HWT filtering module 202 processes the HWT signal 208 to generate a high frequency torque signal 210 and a low frequency torque signal 212. More details of the HWT filtering module 202 will be described further below with reference to FIG. 3.

Figure 5:
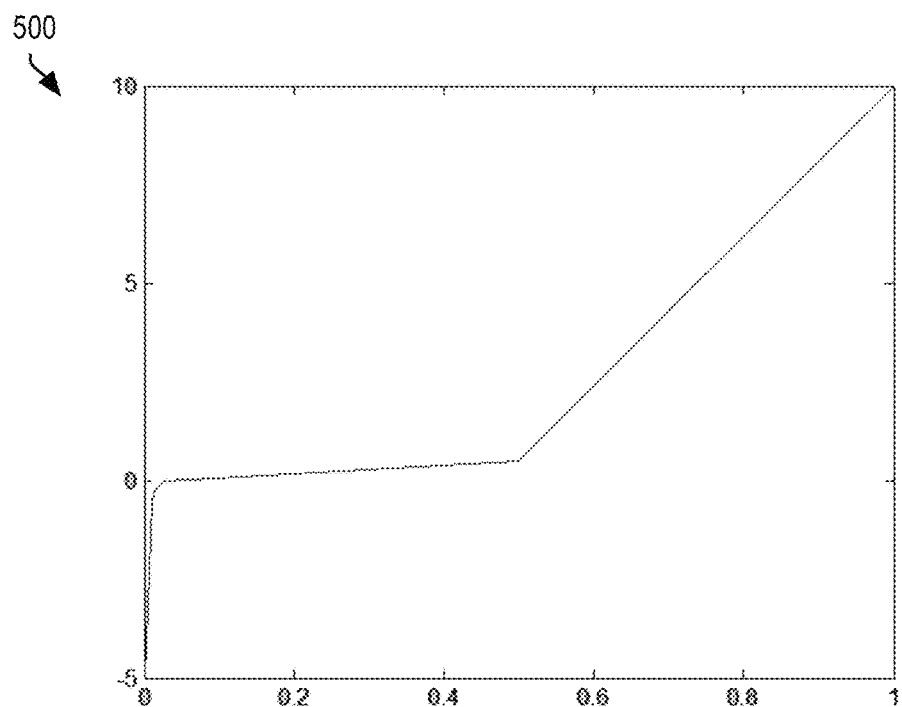
FIG. 5 illustrates a weighting function in accordance with exemplary embodiments of the invention.
Figure 6:
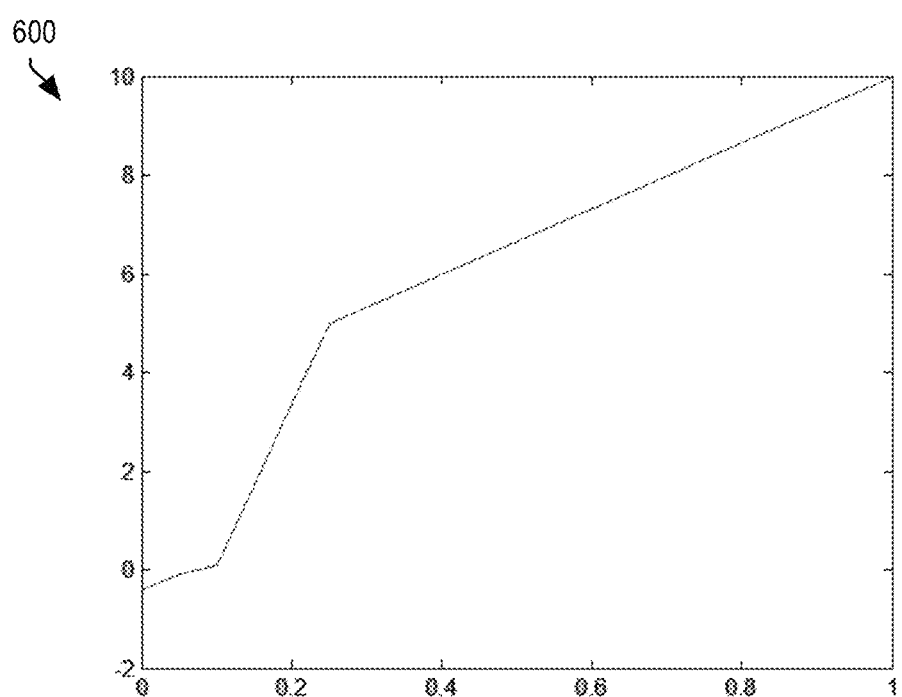
FIG. 6 illustrates a weighting function in accordance with exemplary embodiments of the invention.

The HOW estimate calculation module 204 processes the high frequency torque signal 210 and the low frequency torque signal 212 to generate a HOW estimate signal 214. In some embodiments, the HOW estimate signal 214 represents a value within a range (e.g., from 0 to 1) that indicates the likelihood that the hands of an operator of the vehicle 10 of FIG. 1 are on (e.g., 1) or off (e.g., 0) the hand wheel 14 of FIG. 1. More details of the estimate calculation module 204 will be described further below with reference to FIGS. 4, 5, and 6.

The HOW state calculation module 206 generates a HOW state signal 216 based on the HOW estimate signal 214. In some embodiments, the HOW state signal 214 represents an enumerated discrete value that specifies the confidence level of the operator's hands on or off of the hand wheel 14. More details of the HOW state calculation module 206 will be described further below with reference to FIGS. 7, 8, and 9.

Figure 3:
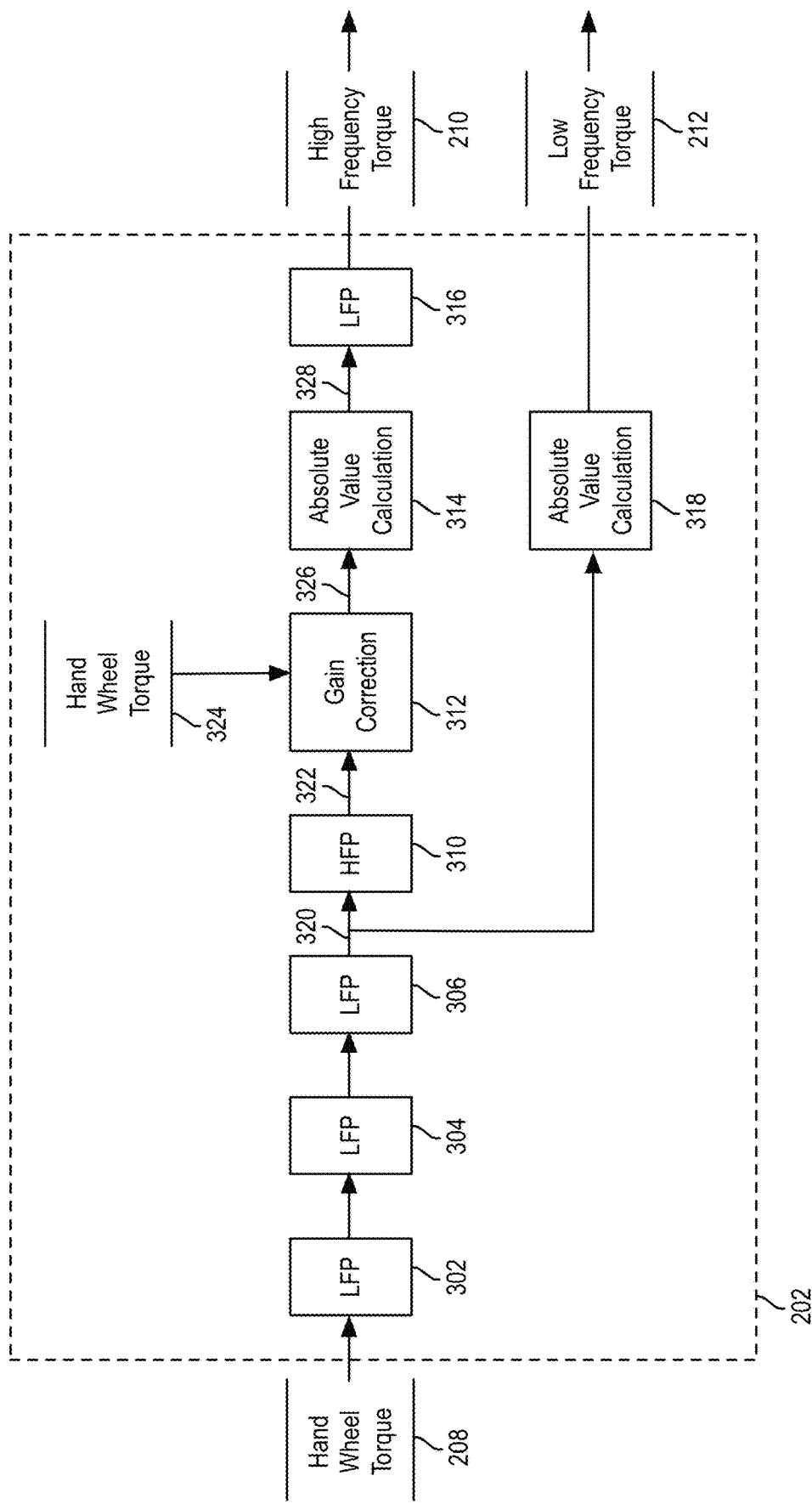
FIG. 3 illustrates a schematic diagram of a hand wheel torque filtering module in accordance with exemplary embodiments of the invention.

FIG. 3 illustrates a schematic diagram of the HWT filtering module 202 of FIG. 2 in accordance with exemplary embodiments of the invention. As shown, the HWT filtering module 202 may include submodules such as low pass filters (LPFs) 302, 304, and 306, a high pass filter (HPF) 310, a gain correction module 312, an absolute value calculation module 314, a LPF 316, and an absolute value calculation module 318.

In some embodiments, up to three LPFs 302-306 are cascaded to have a stiff rate of roll-off. The LPFs 302-306 filter the HWT signal 208 to extract the low frequency content 320 out of the HWT signal 208. In some embodiments, the LPFs 302-306 have a cutoff frequency of 5 hertz (Hz). The low frequency content 320 is within a frequency band of 0 Hz to 5 Hz in these embodiments. The absolute value calculation module 318 then takes the absolute value, or the magnitude, of the low frequency content 320 to generate the low frequency torque signal 212.

The HPF 310 filters the low frequency content 318 to get a high frequency content 322 from the low frequency content 320. In some embodiments, the HPF 310 has a cutoff frequency of 1 Hz so that the high frequency content 322 falls within a frequency band of 1 Hz to 5 Hz if the low frequency content 320 falls within a frequency band of 0 Hz to 5 Hz.

In some embodiments, the gain correction module 312 performs gain correction on the high frequency content 322 by multiplying the high frequency content 322 by a high frequency gain value 324. The gain-corrected high frequency content 326 is supplied to the absolute value calculation module 314, which takes the absolute value, or the magnitude, of the gain corrected high frequency content 326. LPF 316 then filters the output 328 of the absolute value calculation module 314 to generate the high frequency torque signal 210. In some embodiments, the LPF 316 has a cutoff frequency of 5 Hz, which may be the same as the cutoff frequency of the LPFs 302-306.

Figure 4:
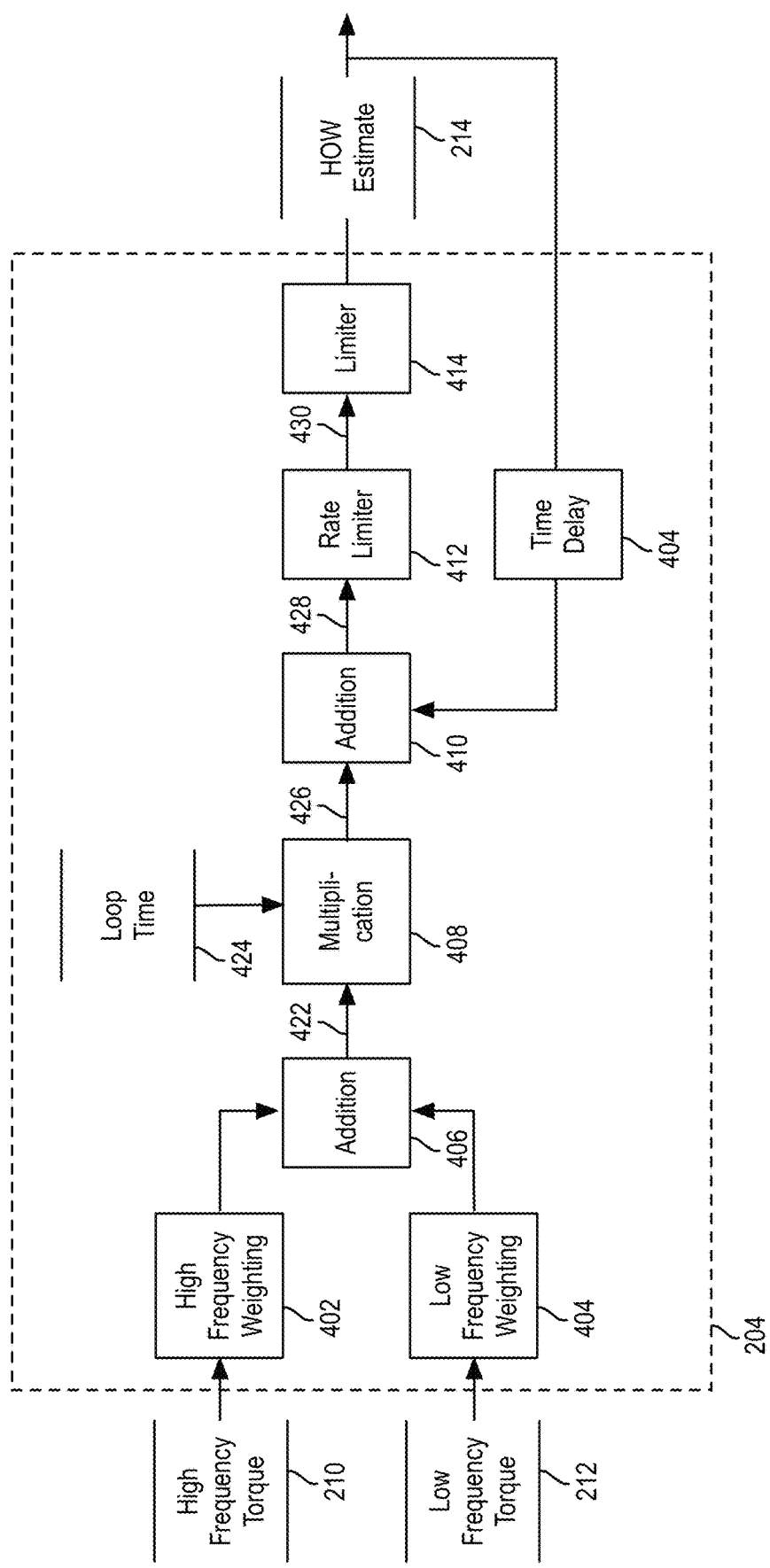
FIG. 4 illustrates a schematic diagram of a hands on wheel (HOW) estimate calculation module in accordance with exemplary embodiments of the invention.

FIG. 4 illustrates a schematic diagram of the HOW estimate calculation module 204 of FIG. 2 in accordance with exemplary embodiments of the invention. As shown, the HOW estimate calculation module 204 may include submodules such as a high frequency weighting module 402, a low frequency weighting module 404, an addition module 406, a multiplication module 408, an addition module 410, a rate limiter module 412, a limiter module 414, and a time delay module 416.

The high frequency weighting module 402 and the low frequency weighting module 404 determines relative contribution of the high and low frequency torque signals 210 and 212 to the HOW estimate signal 214. Specifically, the high frequency weighting module 402 implements a weighting function shown in FIG. 5. In the graph 500 shown in FIG. 5, the horizontal axis represents the magnitude of high frequency torque (e.g., in Newton-meter (Nm)) while the vertical axis represents a weighting rate for the high frequency torque signal 210. The low frequency weighting module 404 of FIG. 4 implements a weighting function shown in FIG. 6. In the graph 600 shown in FIG. 6, the horizontal axis represents the magnitude of low frequency torque (e.g., in Nm) while the vertical axis represents a weighting rate for the low frequency torque signal 212. In some embodiments, the weighing functions may be implemented in the form of tables, where weighting rate values are indexed by the values of the high and low frequency torque signals 210 and 212. The frequency functions or the tables are calibratable. In some embodiments, the output values of the frequency functions or table values are scheduled to additionally depend on a vehicle velocity signal (e.g., generated by a vehicle speed sensor, which is one of the sensors 31 and 32 of FIG. 1). It is to be noted that considering the contribution of the high frequency content allows for a more accurate HOW estimation, especially when the hand wheel 14 of FIG. 1 is lightly touched by the hands of the operator.

Referring to FIG. 4, the addition module 406 adds the outputs 418 and 420 of the high frequency weighting module 402 and the low frequency weighting module 404. The multiplication module 408 then multiplies the sum 422 of the outputs by the loop time 424. In some embodiments, the output 426 of the multiplication module 408 is unitless. The addition module 410 then adds the output 426 and a previously generated HOW estimate value (delayed by the time delay module 416) to generate an output 428. The rate limiter module 412 then calculates the rate of the change from the previously generated HOW estimate value to the output 428 by subtracting the previously generated HOW estimate value from the output 428 and dividing the result of the subtraction by a unit of time. In some embodiments, the rate limiter module limits the rate of the change to a calibratable limit by adjusting signal 428. The calibratable limit provides for tuning the maximum rate or speed at which the HOW estimate value changes. The output 430 of the rate limiter module 412 is the output 428 that may or may not have been adjusted. The limiter 414 then limits the output 428 to a range of values between, e.g., 0 and 1, in order to generate the HOW estimate signal 214.

Figure 7:
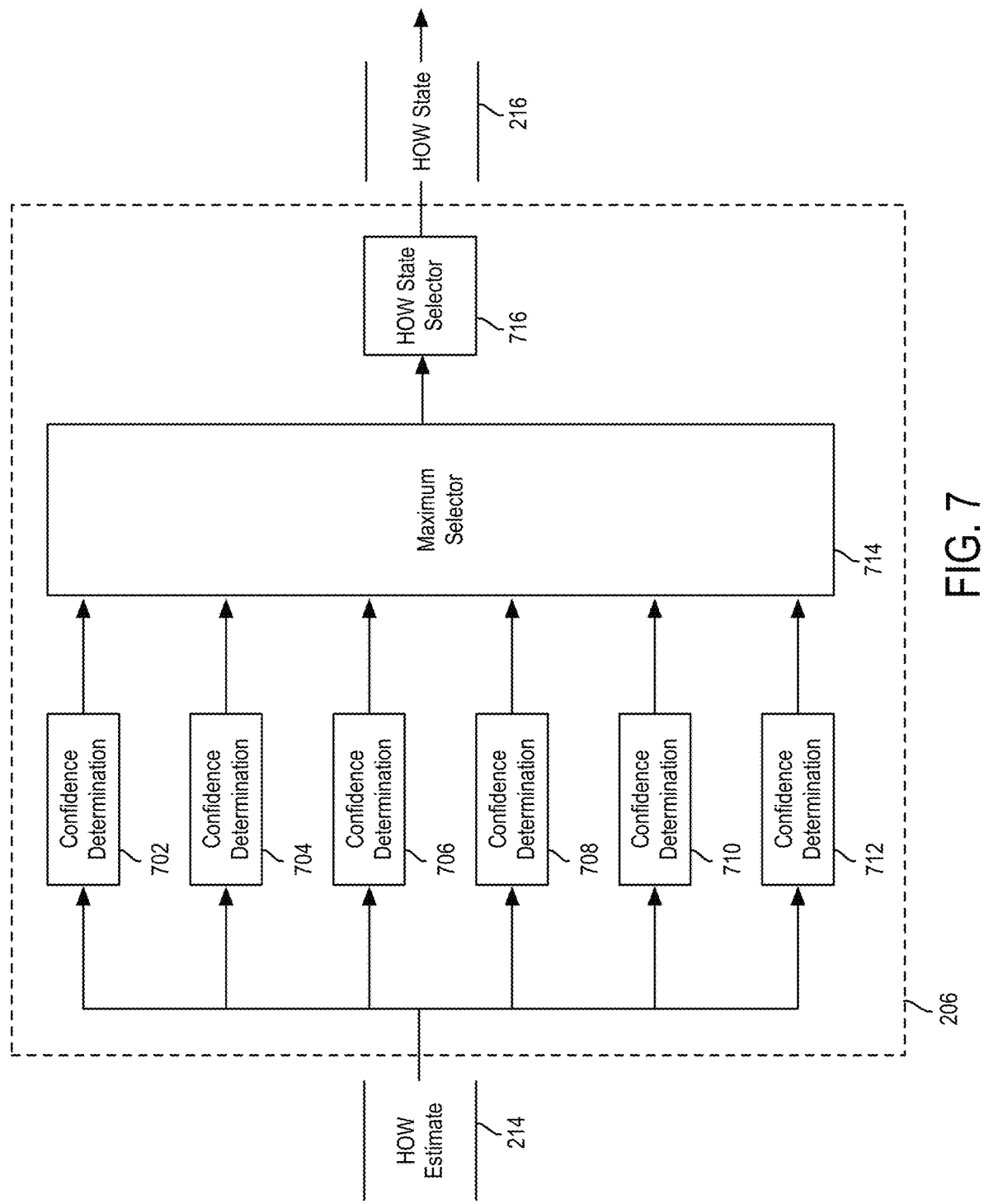
FIG. 7 illustrates a schematic diagram of a HOW state calculation module in accordance with exemplary embodiments of the invention.

FIG. 7 illustrates a schematic diagram of the HOW state calculation module 206 of FIG. 2 in accordance with exemplary embodiments of the invention. The HOW state calculation module 206 monitors the HOW estimate signal 214 and generates the HOW state signal 216 that specifies the confidence level of the vehicle operator's hands on or off of the hand wheel. Specifically, in some embodiments, HOW state signal represent enumerated discrete values that represent different confidence levels. For instance, the enumerated discrete values are integers between −3 and 3, where −3 indicates high confidence that the hands are off the hand wheel while 3 is high confidence that the hands are on the hand wheel, −2 indicates medium confidence that the hands are off the hand wheel, 2 indicates medium confidence that the hands are on the hand wheel, −1 indicates low confidence that the hands are off the hand wheel, 1 indicates low confidence that the hands are off the hand wheel, and 0 indicates that whether hands are on or off the hand wheel is undetermined.

As shown in FIG. 7, the HOW state calculation module 206 includes submodules such as confidence determination modules 702-712, a maximum selector module 714, and a HOW state selector module 716. Each of the confidence determination module 702-712 monitors the HOW estimate signal 214 and outputs an index number, which is used to select a value from the enumerated confidence levels.

Specifically, in some embodiments, the confidence determination module 702 outputs 0 or 1, the confidence determination module 704 outputs 0 or 2, the confidence determination module 706 outputs 0 or 3, the confidence determination module 708 outputs 0 or 4, the confidence determination module 710 outputs 0 or 5, and the confidence determination module 712 outputs 0 or 6. The operation of the confidence determination modules 702-712 will be described in more details further below with reference to FIGS. 9 and 10.

In these embodiments, the maximum selector module 714 identifies the largest index value among the six index values that the confidence determination modules 702-712 output and sends the largest index value to the HOW state selector module 716. The HOW state selector module 716 then selects a HOW state value from an array of [0, −1, −2, −3, 1, 2, 3] using the largest index value received from the maximum selector module 714. The HOW state selector module 716 outputs the selected HOW state value as the HOW state signal 216.

Figure 8:
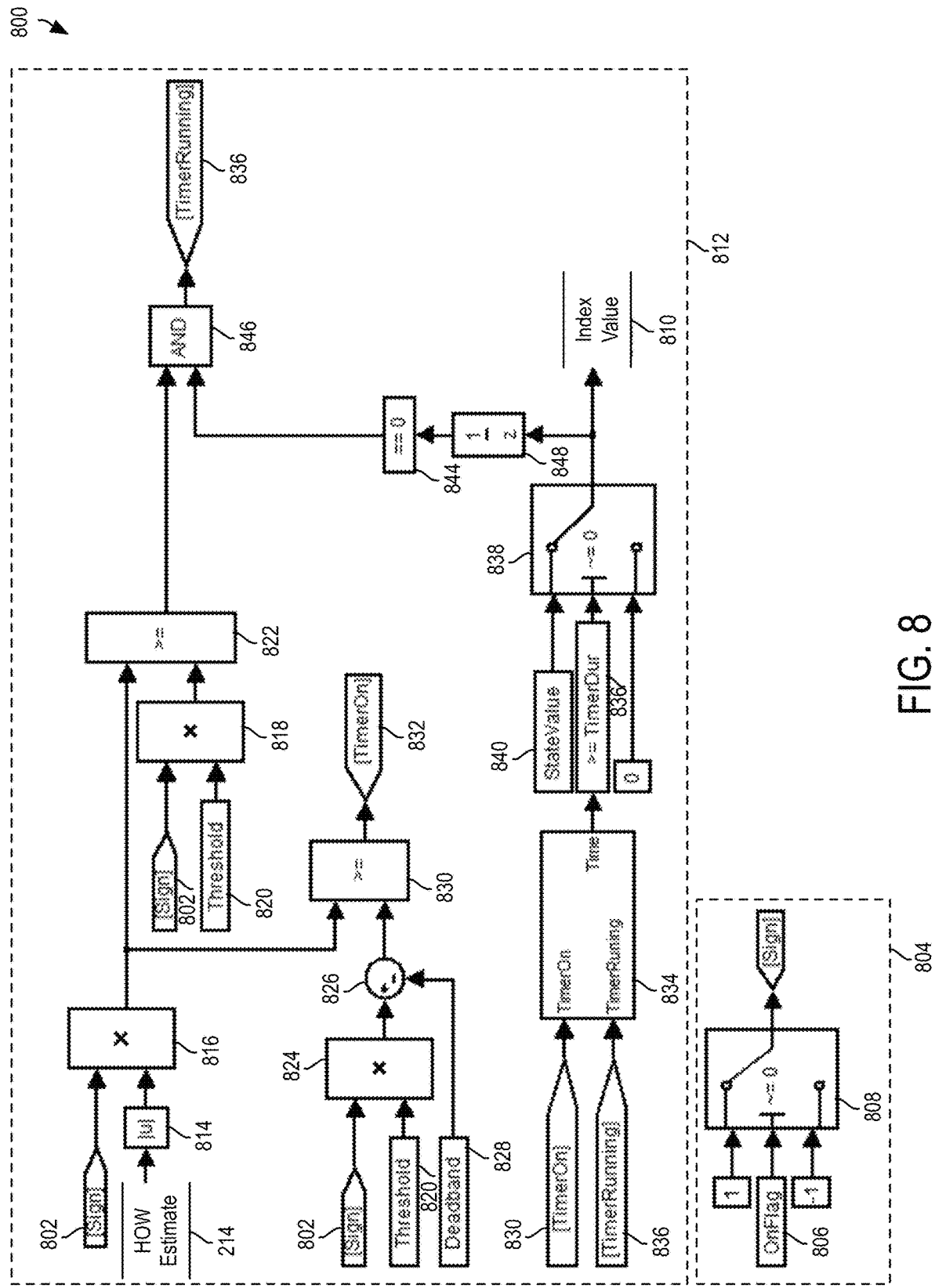
FIG. 8 illustrates a schematic diagram of a confidence determination module in accordance with exemplary embodiments of the invention.

FIG. 8 illustrates a schematic diagram of a confidence determination module 800 in accordance with exemplary embodiments of the invention. The confidence determination module 800 implements one of the confidence determination modules 702-712 of FIG. 7.

Determination of a sign value 802 is illustrated in a dotted box 804 shown near the lower left corner of FIG. 8. The sign value 802 is used to indicate a sign (e.g., positive or negative) of a particular value by being multiplied to the particular value. An OnFlag 806 may have a value of 0 or 1, where 0 indicates a timer is off and 1 indicates the timer is on. The box 808 sets the sign value 802 to 1 (i.e., positive) if the OnFlag 806 is not 0 and to −1 (i.e., negative) if the OnFlag 806 is 1.

Determination of an index value 810 by monitoring the HOW estimate signal 214 is shown in a dotted box 812. Box 814 takes an absolute value or a magnitude of the HOW estimate signal 214. The box 816 assigns a sign to the absolute value of the HOW estimate signal 214 by multiplying by the sign value 802. Box 818 assigns a sign to a threshold value 820 by multiplying by the sign value 802. Box 822 compares the outputs of the boxes 816 and 818. If the output of box 816 is greater than or equal to the output of box 818, box 822 outputs 1 (i.e., a Boolean true). If the output of box 816 is less than the output of box 818, box 822 outputs 0 (i.e., a Boolean false).

Box 824 assigns a sign to a threshold value 820 by multiplying by the sign value 802. The subtractor 826 subtracts a deadband 828 from the signed threshold 820. The deadband 828 represents a subrange of values within the range (e.g., from 0 to 1) of the HOW estimate signal 214. Box 830 compares the outputs of the box 816 and the subtractor 826. If the output of box 816 is greater than or equal to the output of subtractor 826, box 830 outputs 1 (i.e., a Boolean true). If the output of box 816 is less than the output of subtractor 826, box 830 outputs 0 (i.e., a Boolean false). The output of box 830 is TimerOn 832, which indicates whether the timer is on or off. TimerOn 832 is the same as OnFlag 806 shown in the dotted box 804.

Box 834 takes as inputs TimerOn 832 and TimerRunning 836. TimerRunning 836 is a flag that indicates whether the timer is running (e.g., 1) or not (e.g., 0). That is, TimerRunning 836 indicates whether the timer is getting incremented or paused. Box 834 resets, increments, or pauses to increment the timer based on TimerOn 832 and TimerRunning 836. Specifically, box 834 increments the timer (e.g., by 1) when TimerOn is 1 and TimerRunning is 1. Box 834 pauses to increment the timer when TimerOn is 1 and TimerRunning is 0. Box 834 resets the timer to, e.g., 0 when TimerOn is 0.

Box 842 compares the output of the box 834 (i.e., the timer) with TimerDuration (depicted as TimerDur), which is a value representing a threshold duration of time. If the timer is greater than or equal to TimerDuration, box 842 outputs 1 (i.e., a Boolean true). If the timer is less than TimerDuration, box 842 outputs 0 (i.e., a Boolean false). Box 838 outputs StateValue 840, which is an index value (e.g., 1, 2, 3, 4, 5, or 6) if the output of box 842 is not 0 (i.e., is 1). Box 838 outputs an index value of 0 if the output of box 842 is 0. StateValue 840 is different for each of the confidence determination modules 702-712 of FIG. 7 that the confidence determination module 800 implements.

The output of box 838 is the index value 810, which is therefore an output for each of the confidence determination modules 702-712 of FIG. 7. That is, in some embodiments, the index value 810 is 0 or 1 when the confidence determination module 800 implements the confidence determination module 702. The index value 810 is 0 or 2 when the confidence determination module 800 implements the confidence determination module 704. The index value 810 is 0 or 3 when the confidence determination module 800 implements the confidence determination module 706. The index value 810 is 0 or 4 when the confidence determination module 800 implements the confidence determination module 708. The index value 810 is 0 or 5 when the confidence determination module 800 implements the confidence determination module 710. The index value 810 is 0 or 6 when the confidence determination module 800 implements the confidence determination module 712.

Box 848 delays the index value 810. Box 848 determines whether the index 810 is equal to 0. If the index value 810 equals to zero, box 844 outputs 1 (i.e., a Boolean true). If the index value 810 is not 0, box 844 outputs 0 (i.e., a Boolean false). Box 846 performs a logical AND process on the output of box 822 and the output of box 844. The output of box 846 is set to TimerRunning 836.

In some embodiments, the threshold value 820 is configured to be a different value for each of the confidence determination module 702-712. For instance, the threshold 820 may be set to the lowest value for the confidence determination module 702, to an incrementally higher value for the confidence determination modules 704-710, and to the highest value for the confidence determination module 712. In some embodiments, the deadband 828 and/or TimerDuration may be set differently for each of the confidence determination modules 702-712.

Figure 9:
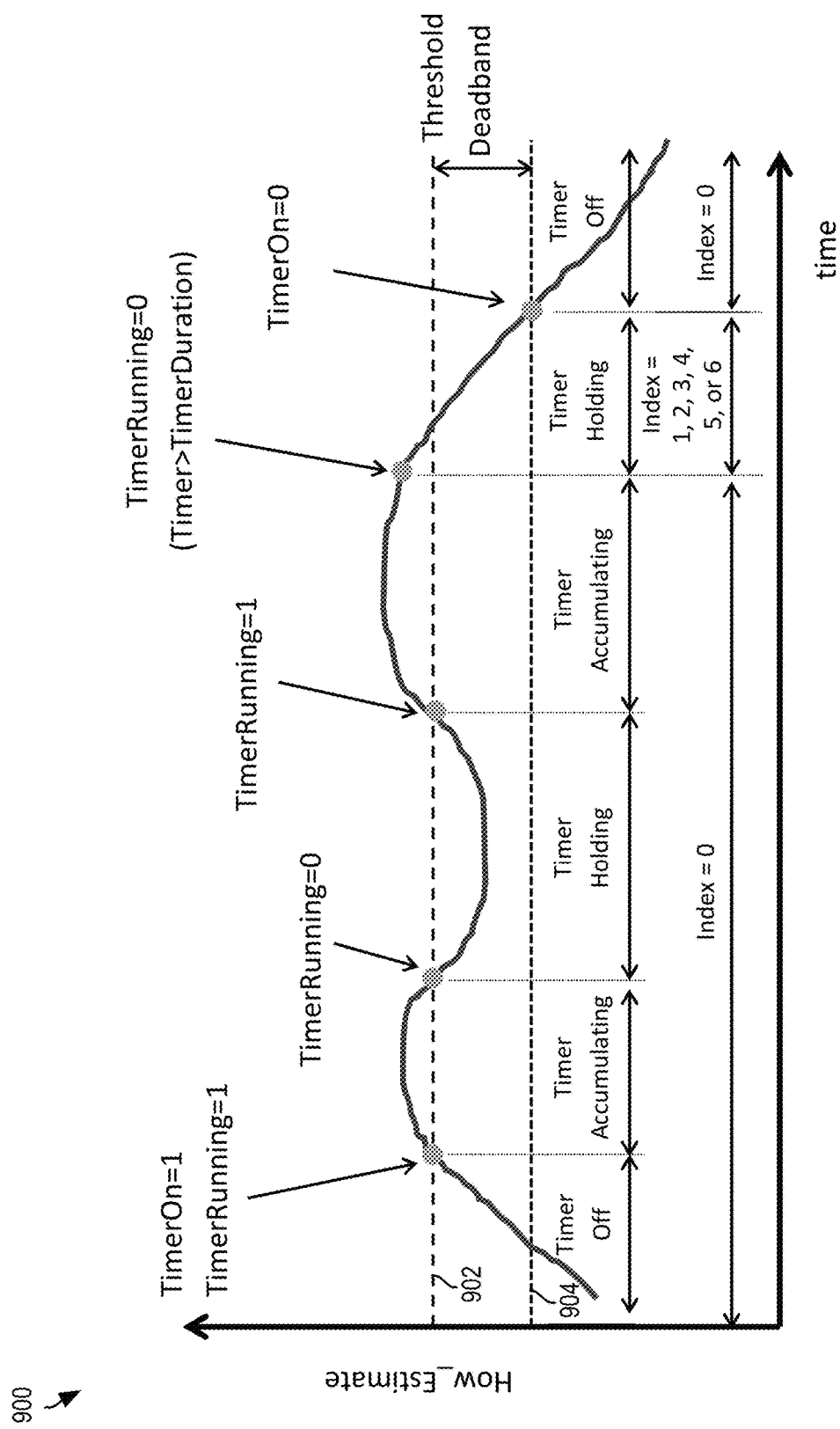
FIG. 9 illustrates a graph that shows an example operation of the confidence determination module in accordance with exemplary embodiments of the invention.

FIG. 9 illustrates a graph 900 that shows an example operation of the confidence determination module 800 of FIG. 9. Specifically, the vertical axis of the graph 900 represents the values of the HOW estimate signal 214, and the horizontal axis of the graph 900 represents time. The dotted line 902 represents the threshold value 820 of FIG. 8.

The difference between the dotted line 902 and the dotted line 904 represents the deadband 828 of FIG. 8. The horizontal axis may be divided into timer-off and timer-on periods. A timer-on period may be divided into timer accumulating (incrementing) periods and timer holding (paused) periods.

Figure 10:
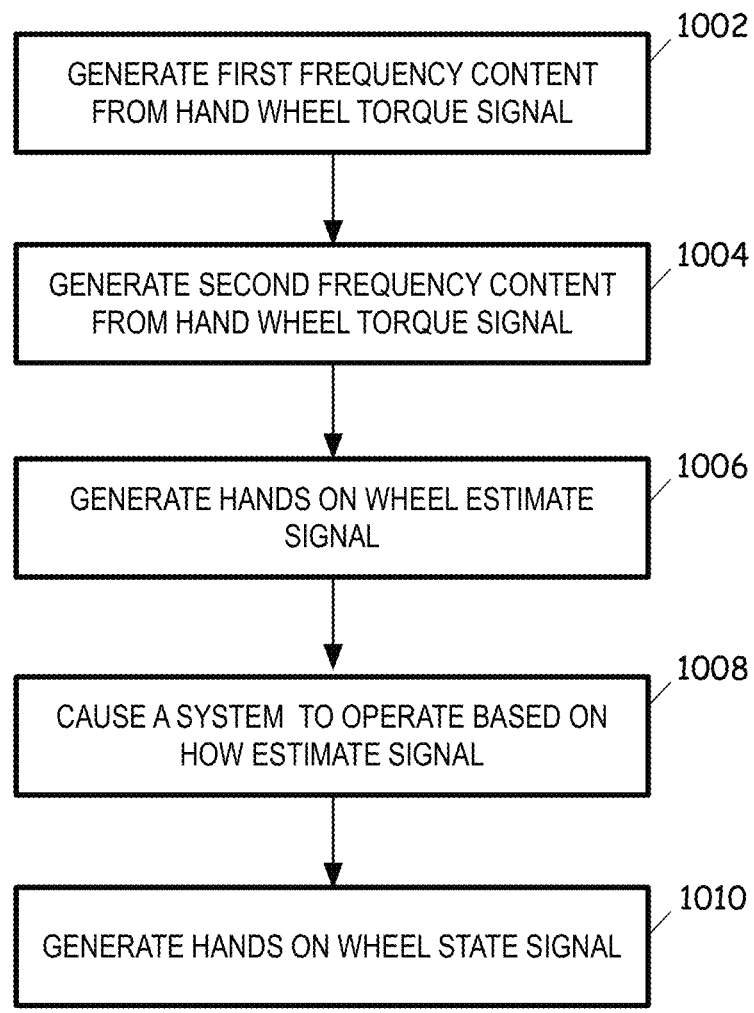
FIG. 10 illustrates a flow diagram illustrates a method for determining whether hands of an operator of a vehicle are positioned on a hand wheel of the vehicle in accordance with exemplary embodiments of the invention.

Referring now to FIG. 10, a flow diagram illustrates a method for generating a HOW estimate signal, which the control module 40 may be configured to perform. As can be appreciated in light of the disclosure, the order of operation within the method is not limited to the sequential execution as illustrated in FIG. 10, but may be performed in one or more varying orders as applicable and in accordance with the present disclosure. In some embodiments, the method can be scheduled to run based on predetermined events, and/or run continually during operation of the vehicle 10.

At block 1002, the control module 40 generates a first frequency content below a first frequency from a hand wheel torque signal. In some embodiments, the control module 40 uses one or more low pass filters that have the first frequency as a cutoff frequency (e.g., 5 Hz). The first frequency content, therefore, has a portion of the hand wheel torque signal that has frequencies between, for example, 0 Hz and 5 Hz. In some embodiments, up to three low pass filters are cascaded to have a stiff rate of roll-off.

At block 1004, the control module 40 generates a second frequency content above a second frequency from the hand wheel torque signal. More specifically, in some embodiments, the control module 40 generates the second frequency content from the low frequency content. In some embodiments, the control module 40 uses a high pass filter that has the second frequency as a cutoff frequency (e.g., 1 Hz). The second frequency content, therefore, has a portion of the hand wheel torque signal that has frequencies between, for example, 1 Hz and 5 Hz, in some embodiments.

At block 1006, the control module 40 generates a hands on wheel (HOW) estimate signal based on the first frequency content and the second frequency content. Specifically, in some embodiments, the control module 40 determines first contribution of the first frequency content to the HOW estimate signal. The control module also determines second contribution of the second frequency content to the HOW estimate signal. The control module 40 combines the first contribution and the second contribution to generate the HOW estimate signal. In some embodiments, the control module 40 limits a rate of change of the HOW estimate signal. In some embodiments, the control module 40 also limits the HOW estimate signal to a range of values (e.g., values between 0 and 1).

At block 1008, the control module 40 optionally causes a system in a vehicle to operate based on the HOW estimate signal by sending the HOW estimate signal to the system. The system includes at least one of advanced driver assistance systems (ADAS), electronic stability control (ESC) system, and an alerting system that notifies the operator of the vehicle to take control of the hand wheel.

At block 1010, the control module 40 optionally generates a HOW state signal from the HOW estimate signal. Specifically, in some embodiments, the control module 40 sets the HOW state signal to a discrete value in response to determining that the HOW estimate signal stays above a predetermined threshold value for longer than a threshold duration of time. In some embodiments, the control module 40 causes the system to operate further based on the HOW state signal.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while some embodiments of the invention have been described, it is to be understood that aspects of the invention may include only some of the described embodiments. Accordingly, the invention is not to be seen as limited by the foregoing description.

Having thus described the invention, it is claimed:

1. A method for determining whether hands of an operator of a vehicle are positioned on a hand wheel of the vehicle, comprising:
generating a first frequency content below a first frequency from a hand wheel torque signal;
generating a second frequency content above a second frequency from the first frequency content of the hand wheel torque signal;
generating a hands on wheel (HOW) estimate signal based on the first frequency content and the second frequency content by determining a first contribution of the first frequency content to the HOW estimate signal, determining a second contribution of the second frequency content to the HOW estimate signal, and combining the first contribution and the second contribution to generate the HOW estimate signal; and
causing a system in a vehicle to operate based on the HOW estimate signal.

2. The method of claim 1, wherein the generating the first frequency content comprises using a plurality of cascaded low pass filters with the first frequency as a cutoff frequency.

3. The method of claim 1, wherein the generating the second frequency content comprises using a high pass filter with the second frequency as a cutoff frequency.

4. The method of claim 1, wherein the generating the HOW estimate signal comprises limiting a rate of change of the HOW estimate signal.

5. The method of claim 1, wherein the generating the HOW estimate signal comprises limiting the HOW estimate signal to a range of values.

6. The method of claim 1, further comprising generating a HOW state signal from the HOW estimate signal.

7. The method of claim 6, wherein the generating the HOW state signal comprises setting the HOW state signal to a discrete value in response to determining that the HOW estimate signal stays above a predetermined threshold value for longer than a threshold duration of time.

8. The method of claim 6, wherein the causing the system to operate comprises causing the system to operate further based on the HOW state signal.

9. The method of claim 1, wherein the system comprises at least one of advanced driver assistance systems (ADAS), electronic stability control (ESC) system, and an alerting system that notifies the operator of the vehicle to take control of the hand wheel.

10. A control system of a vehicle, comprising:
a hand wheel torque sensor configured to generate a hand wheel torque signal based on a movement of a hand wheel of the vehicle; and
a control module for determining whether hands of an operator of the vehicle are positioned on a hand wheel of the vehicle, the control module configured to:
generate a first frequency content below a first frequency from a hand wheel torque signal;
generate a second frequency content above a second frequency from the first frequency content of the hand wheel torque signal;
generate a hands on wheel (HOW) estimate signal based on the first frequency content and the second frequency content by determining a first contribution of the first frequency content to the HOW estimate signal, determining a second contribution of the second frequency content to the HOW estimate signal, and combining the first contribution and the second contribution to generate the HOW estimate signal; and
cause another system in a vehicle to operate based on the HOW estimate signal.

11. The system of claim 10, wherein the control module is configured to generate the first frequency content by using a plurality of cascaded low pass filters with the first frequency as a cutoff frequency.

12. The system of claim 10, wherein the control module is configured to generate the second frequency content by using a high pass filter with the second frequency as a cutoff frequency.

13. The system of claim 10, wherein the control module is configured to generate the HOW estimate signal by limiting a rate of change of the HOW estimate signal.

14. The system of claim 10, wherein the control module is configured to generate the HOW estimate signal by limiting the HOW estimate signal to a range of values.

15. The system of claim 10, wherein the control module is further configured to generate a HOW state signal from the HOW estimate signal.

16. The system of claim 15, wherein the control module is configured to generate the HOW state signal by setting the HOW state signal to a discrete value in response to determining that the HOW estimate signal stays above a predetermined threshold value for longer than a threshold duration of time.

17. The system of claim 15, wherein the control module is configured to cause the system to operate further based on the HOW state signal.

18. The system of claim 10, wherein the other system comprises at least one of advanced driver assistance systems (ADAS), electronic stability control (ESC) system, and an alerting system that notifies the operator of the vehicle to take control of the hand wheel.

* * * * *